Aug. 4, 1953   B. R. NYHAGEN   2,647,428
VIOLIN MUTE AND RESIN HOLDER
Filed Feb. 1, 1952

INVENTOR.
BARNEY R. NYHAGEN
BY
Clark & Ott
ATTORNEYS

Patented Aug. 4, 1953

2,647,428

UNITED STATES PATENT OFFICE 2,647,428

VIOLIN MUTE AND RESIN HOLDER

Barney R. Nyhagen, New York, N. Y.

Application February 1, 1952, Serial No. 269,437

2 Claims. (Cl. 84—310)

This invention relates to a violin mute which is so constructed and arranged as to provide a holder for resin adapted for use to apply resin to the bow strings.

An object of the invention is to provide a resin holder having a recess for receiving and holding a supply of resin in the bottom thereof and providing side walls which are spaced apart a suitable distance for receiving the strings of the violin bow therebetween so as to constitute a guide for applying resin to the bow by stroking the strings over the resin supply.

Still another object of the invention is to provide a resin holder of said character in which the opposite walls are slitted for engagement over the bridge of the violin so as to constitute a violin mute and with the resin located in the recess inwardly of the slitted portion of the side walls.

Still another object of the invention is to provide an elongated holder for containing a relatively large supply of resin and in which the opposite side walls are provided with a plurality of parallel closely spaced slots to permit of expansion of the intermediate slot for engagement over the bridge of the violin and which elongated holder deadens the sound of the violin to render the same practically inaudible.

With the foregoing and other objects in view, reference is now made to the following specification and accompanying drawings in which the preferred embodiments of the invention are illustrated.

Figure 1:
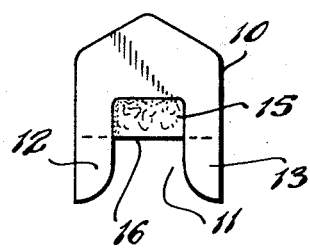
Fig. 1 is a side view of a violin mute constructed in accordance with the invention to provide a resin holder and shown with a supply of resin therein.
Figure 2:
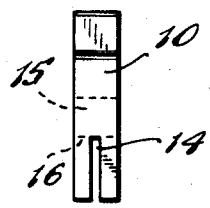
Fig. 2 is an end view thereof.

Referring to the drawings by characters of reference, and more particularly to the form of the invention illustrated in Figs. 1 and 2 of the drawings, the violin mute 10, preferably constructed of wood or equivalent material, is formed with a recess 11 extending inwardly from the bottom thereof so as to provide oppositely disposed side walls 12 and 13 which are spaced apart a suitable distance for receiving the bow strings therebetween. The side walls 12 and 13 are each formed with a slot 14 extending laterally through the inner and outer edges thereof and extending inwardly from the end thereof to a point approximately midway of the depth of the recess 11. The slots 14 are disposed in alignment and are of a width to receive the bridge of the violin therein so as to retain the mute in upstanding position thereon for muting the sound of the violin. Arranged in the bottom of the recess 11 is a resin supply 15 formed with a flat lower face 16 disposed substantially in alignment with the inner ends of the slots 14.

The mute thus constitutes a holder for a resin supply which is applied to the strings by stroking the strings over the lower face 16 thereof between the side walls 12 and 13 which form guides. The resin supply is firmly anchored in the bottom of the recess 11 and will not break loose or crack with the flexing of the opposite side walls of the slots 14 when the same are sprung apart in applying the mute to the bridge of the instrument.

Figure 3:
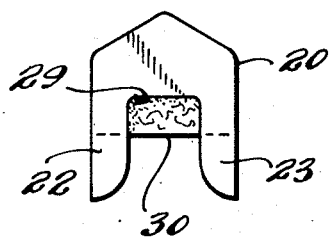
Fig. 3 is a view in elevation of a modified form of violin mute constituting a resin holder.
Figure 4:
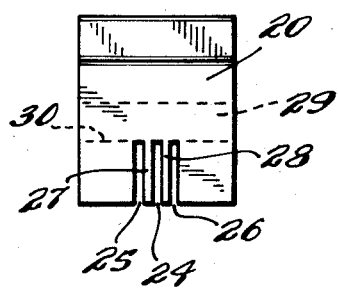
Fig. 4 is an end view thereof.
Figure 5:
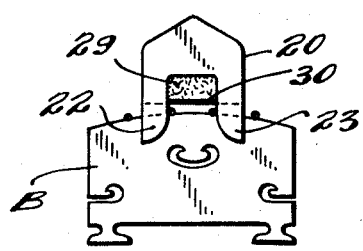
Fig. 5 is a view of the violin mute constituting a resin holder in place on the bridge of a violin.

In the form of the invention illustrated in Figs. 3 and 4 of the drawings, the mute 20 is of elongated formation so as to deaden the sound of the instrument to render the same practically inaudible. This type of mute is adapted for use when practicing on a violin or other stringed instrument. For this purpose, the mute 20 is formed with a recess 21 extending inwardly from the bottom thereof so as to provide oppositely disposed side walls 22 and 23 which are spaced apart a suitable distance for receiving the bow strings therebetween.

The side walls 22 and 23 are each formed with a centrally disposed slot 24 similar to the slot 14 in the previous form of the invention and which extend laterally through the inner and outer faces thereof and inwardly from the end thereof to a point approximately midway of the depth of the recess 21. In this form of the invention the side walls 22 and 23 are also formed with slots 25 and 26 located on opposite sides and adjacent to the slots 24 respectively and which are disposed in parallel relation therewith and extend through the inner and outer edges and through the ends thereof. The slots 24 in the side walls 22 and 23 are in alignment and are of a width to receive the bridge of the violin or stringed instrument therein so as to dispose the mute in upstanding relation thereon. The slots 25 and 26 in the side walls 22 and 23 form narrow resilient tongues 27 and 28 between the same and the slots 24 which flex outwardly when applied to the bridge of the instrument such as the bridge B fragmentarily illustrated in Fig.

5 of the drawings which is of tapered formation. The recess 21 extends inwardly beyond the bottom of the slots in the side walls 22 and 23 and arranged in the bottom of the recess is a resin supply 29 with the lower face 30 thereof disposed substantially flush with the inner ends of the slots.

What is claimed is

1. A resin holder consisting of a body having a recess extending inwardly from one end and opening through the opposite sides thereof so as to form oppositely disposed wall portions, said wall portions having aligned laterally extending slots opening through the ends and the opposite sides thereof arranged with the slots in one wall portion disposed in alignment with the slots respectively in the other wall portion so as to form resilient tongues on opposite sides of the intermediate slot adapted to resiliently engage the opposite sides of a bridge of a musical instrument for mounting the holder thereon, a resin supply secured in the recess with the outer face thereof disposed substantially flush with the inner ends of said slots, and said wall portions being spaced apart a distance to receive the strings of the bow of a musical instrument therebetween for applying resin thereto with the outer ends of said wall portions forming guides for stroking the strings of the bow over the outer face of the resin supply.

2. A resin holder consisting of a body having a recess extending inwardly from one edge thereof and opening through the opposite ends thereof so as to form oppositely disposed side walls, said side walls having aligned laterally extending slots which open through the edges and opposite side faces thereof to thereby provide resilient side wall portions on opposite sides of said slots respectively for receiving the bridge of a musical instrument in said slots in tensioned engagement between said side wall portions, a resin supply secured in the recess with the outer face thereof disposed substantially flush with the inner ends of said slots, and said side walls being spaced apart a distance to receive the strings of the bow of a musical instrument therebetween for applying resin thereto with the outer ends of said side walls forming guides for stroking the strings of the bow over the outer face of the resin supply.

BARNEY R. NYHAGEN.

References Cited in the file of this patent

UNITED STATES PATENTS

| Number | Name | Date |
| --- | --- | --- |
| 331,751 | Angus | Dec. 8, 1885 |
| 1,098,277 | Lohmann | May 26, 1914 |